United States Patent
Stultz

(10) Patent No.: US 7,721,024 B2
(45) Date of Patent: May 18, 2010

(54) SYSTEM AND METHOD FOR EXITING FROM AN INTERRUPT MODE IN A MULTIPLE PROCESSOR SYSTEM

(75) Inventor: Paul D. Stultz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 515 days.

(21) Appl. No.: 10/706,657

(22) Filed: Nov. 12, 2003

(65) Prior Publication Data

US 2005/0102447 A1    May 12, 2005

(51) Int. Cl.
*G06F 3/00* (2006.01)
(52) U.S. Cl. ............................... 710/48; 710/33; 710/47
(58) Field of Classification Search .................... 710/48, 710/266, 268; 713/310, 322; 711/147, 170
See application file for complete search history.

(56) References Cited

U.S. PATENT DOCUMENTS

| | | | | |
|---|---|---|---|---|
| 4,370,720 A | * | 1/1983 | Hyatt | .......................... 700/194 |
| 5,710,909 A | * | 1/1998 | Brown et al. | ................. 711/170 |
| 5,809,314 A | * | 9/1998 | Carmean et al. | ............ 713/322 |
| 5,889,978 A | | 3/1999 | Jayakumar | .................... 395/500 |
| 5,995,745 A | * | 11/1999 | Yodaiken | ...................... 703/26 |
| 6,003,129 A | | 12/1999 | Song et al. | ................... 712/244 |
| 6,237,058 B1 | | 5/2001 | Nakagawa | ................... 710/260 |
| 6,282,601 B1 | | 8/2001 | Goodman et al. | ........... 710/260 |
| 6,356,984 B1 | * | 3/2002 | Day et al. | .................... 711/147 |
| 6,779,065 B2 | * | 8/2004 | Murty et al. | ................. 710/260 |
| 7,099,978 B2 | * | 8/2006 | Duncan et al. | .............. 710/266 |
| 2003/0046464 A1 | * | 3/2003 | Murty et al. | ................. 710/260 |

\* cited by examiner

*Primary Examiner*—Tariq Hafiz
*Assistant Examiner*—Aurangzeb Hassan
(74) *Attorney, Agent, or Firm*—Baker Botts L.L.P.

(57) ABSTRACT

A system and method for interrupt processing includes a technique for exiting from interrupt mode in multiple processor systems. Those processors that were in a suspended or halt state immediately before entering the interrupt mode are released immediately with reference to the resolution of the interrupt condition. Those processors not responsible for the processing tasks associated with resolving the interrupt condition serially exit from interrupt mode on a time-delayed basis following the resolution of the interrupt condition.

10 Claims, 2 Drawing Sheets

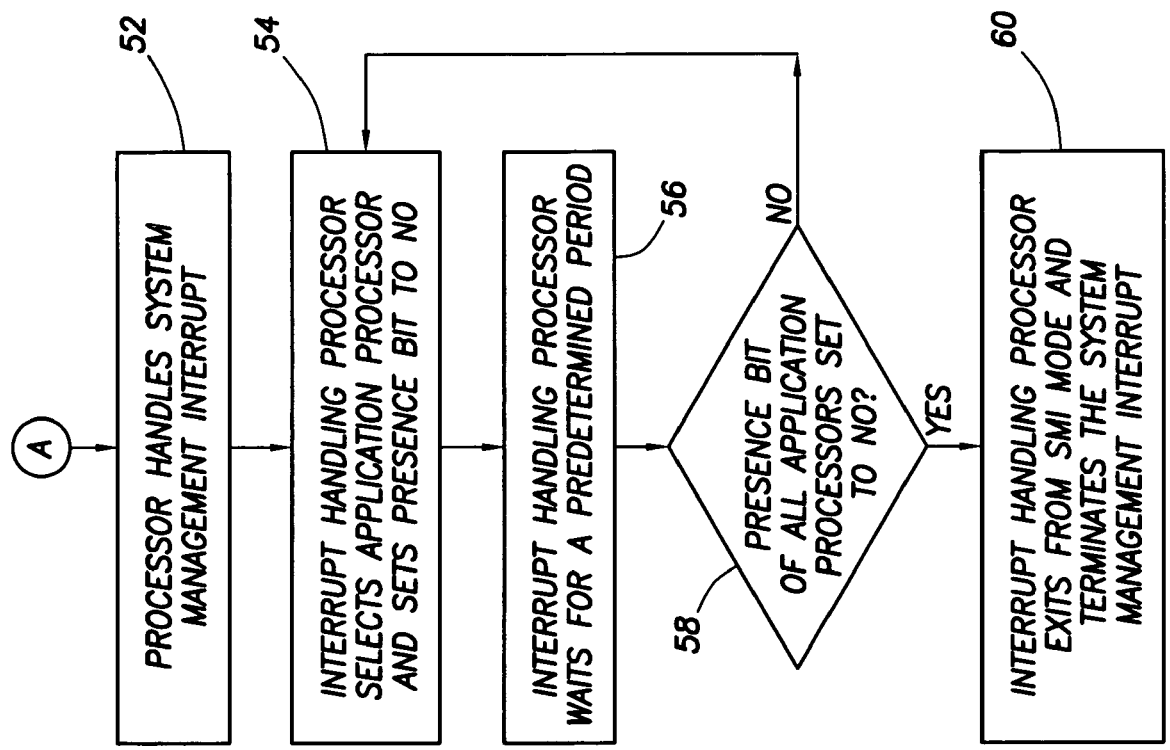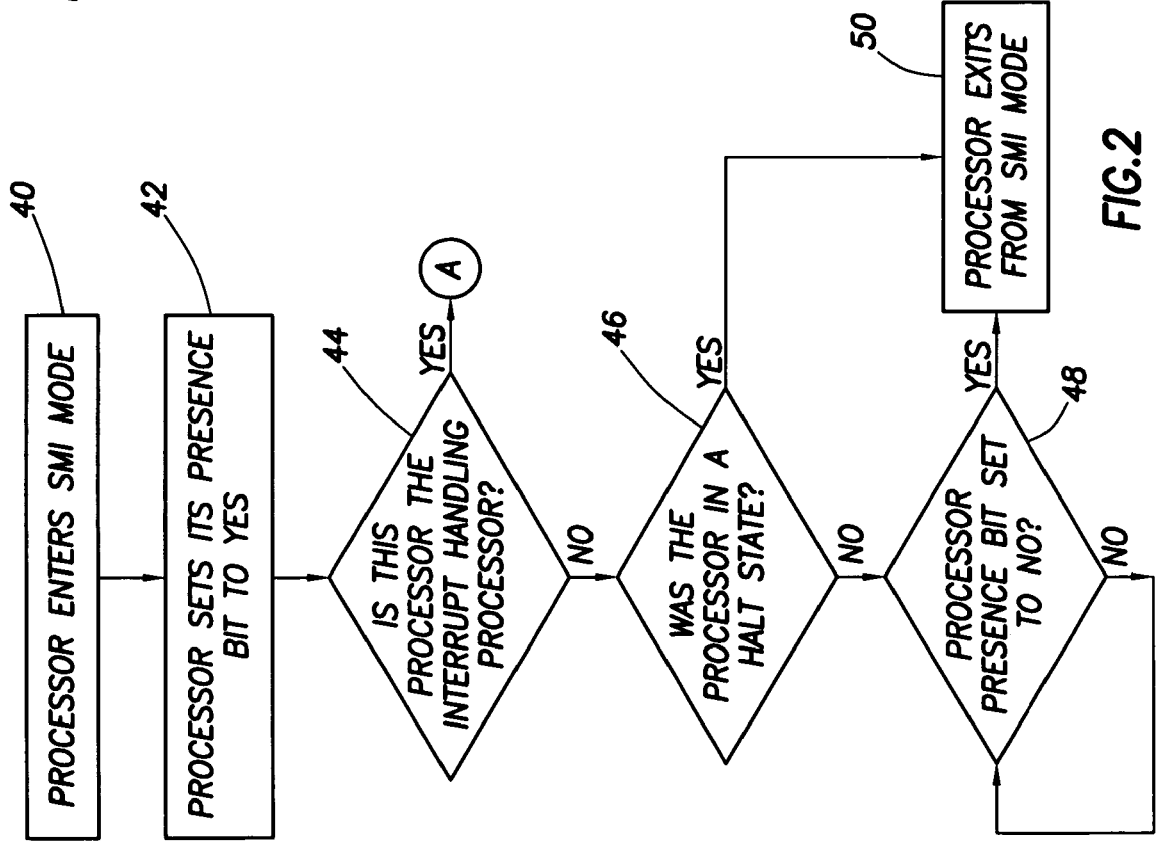

SYSTEM AND METHOD FOR EXITING FROM AN INTERRUPT MODE IN A MULTIPLE PROCESSOR SYSTEM

CROSS-REFERENCE TO RELATED APPLICATIONS

This application is related to a U.S. patent application titled "System and Method for Interrupt Processing in a Multiple Processor System," which has U.S. application Ser. No. 10/706,419, names Paul D. Stultz as inventor, was filed Nov. 12, 2003, and is incorporated by reference herein.

TECHNICAL FIELD

The present disclosure relates generally to the field of computer or information systems, and, more particularly, to a system and method for interrupt processing in a computer or information handling system.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including computer systems, typically include at least one microprocessor, memory, and various input and output devices. The components of a computer system are communicatively coupled together using one or more interconnected buses. As an example, the architecture of a computer system may include a processor that is coupled to a processor bus or host bus. In the case of multiprocessor computer systems, two or more processors may be coupled to the processor bus. A memory controller bridge may be coupled between the processor bus and system memory. In addition, a PCI bridge may be coupled between the processor bus to the PCI bus of the computer system. In some computer systems, the memory controller bridge and the PCI bridge are incorporated into a single device, which is sometimes referred to as the north bridge of the computer system. An expansion bridge, sometimes referred to as a south bridge, couples the PCI bus to an expansion bus, such as the ISA bus. The south bridge also serves as a connection point for USB devices and an IDE bus. The south bridge may also include an interrupt controller.

The processor architecture of a computer system will typically support several types of interrupts. An interrupt is a notification given to the processor that causes the processor to halt the execution of operating code and handle an operating condition that has arisen in the system or in one of the system's external devices. As an example, when a key is pressed on the keyboard, an interrupt is passed to the processor from the peripheral controller. The interrupt causes the processor to momentarily stop its current execution stream and receive data from the peripheral controller. Another type of interrupt is a system management interrupt (SMI). Typically, a SMI is the highest order interrupt that can be issued in a computer system. A SMI is often issued when it is necessary for the processor to handle an error condition in the computer system.

When a system management interrupt is issued to the processor, the processor enters system management mode. In a multiple processor environment, because every processor receives the system management interrupt, each of the processors of the computer system will enter system management mode. As part of system management mode, each processor of the system is allocated a memory block of RAM. This memory space is known as system management RAM or SCRAM. Upon entering system management mode, each processor saves the contents of its registers to its block of allocated SMRAM space.

In multiple processor computer systems, the time required for the handling of a system management interrupt is influenced by the amount of time spent saving processor information to and restoring processor information from the SMRAM associated with each processor. Typically, in a multiple processor computer system, each processor of the computer system will enter a system management interrupt mode, even though only one processor of the computer system will be selected to actually handle the processing associated with the system management interrupt. As such, in a multiprocessor system, each processor must have control of the processor bus and access to system memory in order to enter into and exit from the system management interrupt mode. Because each processor typically attempts to enter into and exit from system management interrupt mode at the same time, the processors typically contend for control of the processor bus and access to memory.

In multiple processor computer systems, the contention by the processors for control of the processor bus and access to memory causes a delay in the handling of a system management interrupt. For example, a number of system management interrupts are typically issued in a power on self test (POST) procedure or the booting of a computer system from a USB device. The contention by the processors for access to the processor bus or memory is a significant contributor to the time necessary for the completion of these events. The process of resolving resource conflicts among multiple processors concerning control of the processor bus and access to memory adds a significant delay to the time associated with resolving a system management interrupt in multiple processor computer systems.

SUMMARY

In accordance with the present disclosure, a technique for exiting from interrupt mode in a multiple processor computer system is provided in which the processors not responsible for resolving the interrupt condition are released from the interrupt condition serially. In the case of an interrupt that causes each processor to enter an interrupt mode, each processor will set an indicator that identifies that the processor is in an interrupt condition. After identifying the processor responsible for handling the processing tasks necessary to resolve the interrupt condition, known as the interrupt handling processor, processors that were in a halt state immediately before entering the interrupt mode are immediately released from interrupt mode. Following the resolution of the cause of the interrupt condition, the interrupt handling processor resets on a serial basis each processor's interrupt mode indicator. The interrupt handling processor resets the respective indicators on a time delay basis, pausing for a time period between each reset of each processor's indicator. As the indicators are reset, the remaining processors exit interrupt mode on a serial basis.

One technical advantage of the present disclosure is the release of processors from an interrupt mode in manner that reduces the contention by the processors for resources of the computer system or information handling system. In accordance with the present invention, the processors exit from interrupt mode on a serial basis according to a time delay managed by the interrupt handling processor. Because the processors exit interrupt mode on a time release basis, the contention by the processors for resources, including the processor bus and memory, of the computer system or information handling system is reduced or eliminated, allowing the computer system or information handling system the ability to complete interrupt-intensive tasks more quickly and without content for processor resources.

Another technical advantage of the present disclosure is a method for immediately releasing from interrupt mode those processors that were in a suspended or halt state immediately before entering the interrupt mode. Because these processors return to a halt or suspended state in which the processors do not execute instructions, these processors will not execute instructions that would deprive other processors from exclusive access to system resources. As such, these processors can be released immediately without regard to contention by the processors for resources of the computer system or information handling system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 is a flow diagram of a series of steps for processing and returning from an interrupt in a computer system; and FIG. 3 is the continuation of the flow diagram of FIG. 2 of a series of steps for processing and returning from an interrupt in a computer system.

DETAILED DESCRIPTION

Figure 1:
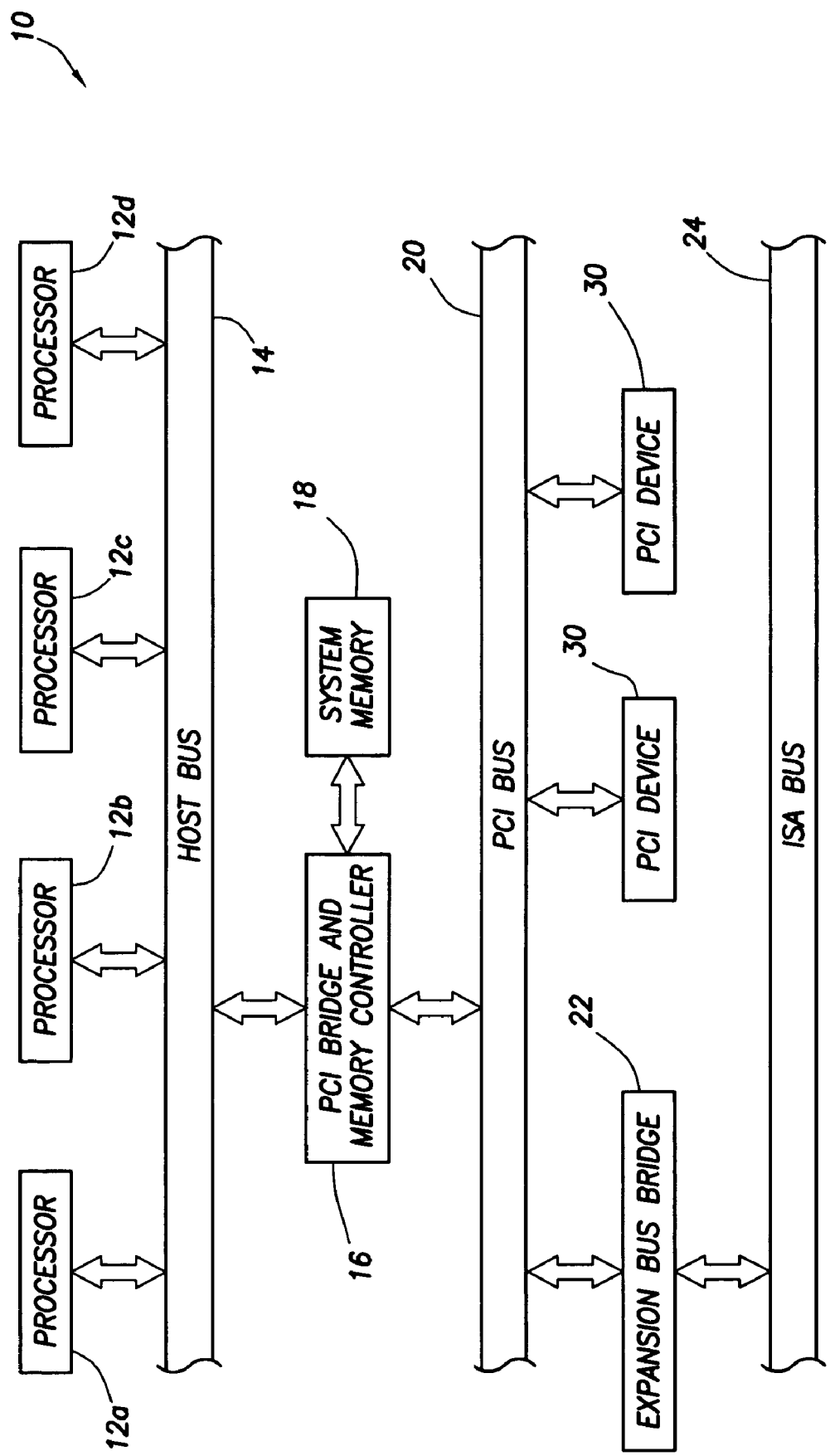
FIG. 1 is a diagram of the architecture of a computer system.

FIG. 1 is a diagram of the architecture of a computer system, which is indicated generally at 10. Computer system 10 is a multiple processor system and includes four processors, identified as processor 12a, processor 12b, processor 12c, and processor 12d. Each of the processors is coupled to a processor or host bus 14. Coupled to processor bus 14 is a PCI bridge and memory controller 16, which is sometimes referred to as a north bridge. System memory 18 is coupled to north bridge 16. North bridge 16 serves as a communications bridge between the host bus 14 and PCI bus 20. In the computer architecture of FIG. 1, PCI devices 30 are coupled to PCI bus 20. In the computer system 10 of FIG. 1, an expansion bus bridge 22 couples PCI bus 20 to an ISA bus 24. As just one alternative to the computer architecture shown in FIG. 1, expansion bus 22 could be coupled to a Super I/O device (not shown). Expansion bus bridge 22 is sometimes referred to as a south bridge.

Shown in FIGS. 2 and 3 is a flow diagram for a method for processing a system management interrupt and returning from system management interrupt mode in a computer system or information handling system. With reference to the computer system 10 of FIG. 1, when a system management interrupt is issued, each of the four processors of the multiple processor computer system will enter system management interrupt mode. In system management interrupt mode, each of the processors will save the contents of its registers to the memory space associated with that processor or SMRAM. Each processor will then execute a series of software instructions. The instructions executed by each processor will vary according to whether the processor at issue, which is sometimes referred to as the subject processor, is selected to handle the processing task associated with the system management interrupt. The processor selected to handle the processing tasks associated with resolving the interrupt is known as the interrupt handling processor. A processor not selected for the resolution of the interrupt is often referred to as a non-interrupt handling processor.

The steps of the flow diagrams of FIGS. 2 and 3 are applied to or performed by each processor, regardless of whether the processor is the interrupt handling processor or the non-interrupt handling processor. At step 40, each processor, whether the interrupt handling processor of the non interrupt handling processor, enters system management interrupt mode, and, at step 42, each processor sets its presence bit to a positive indicator or a logical YES. A presence bit is a bit that indicates whether the processor is in system management interrupt mode. It should be recognized that the presence bit may be a bit, flag, semaphore, or other indicator in the computer system that is associated with one of several processors. In one embodiment, the presence bit is located in the SMRAM space associated with the processor, although it should be recognized that the presence bit may be implemented in some other configuration and it may be possible in some implementations for multiple processors to share a single variable as a presence bit. The location of the presence bit of each processor in system memory permits the presence bit of each processor to be read or set by another processor. Following the entry of the processors into system management mode, the interrupt handling processor is selected according to an arbitration process. At step 44, each processor is interrogated to determine if the subject processor was selected as the interrupt handling processor. If the interrogated or subject processor is the interrupt handling processor, the flow diagram continues at point A on FIG. 3; otherwise, the flow diagram continues at step 46.

At step 46 it is determined if the subject processor was in a halt or suspended state immediately before entering system management mode. If the processor was in a halt or suspended state before entering system management mode, then causing the subject processor to exit from system management interrupt mode immediately and asynchronously relative to the other processors does not pose a risk that the halted or suspended processor will violate the practice of providing other system processors with mutually exclusive access to system resources. Thus, at step 46, if the subject processor was in a halt state immediately before entering system management interrupt mode, the processor exits from system management interrupt mode at step 50.

If it is determined at step 46 that the subject processor was not in a halt state immediately before entering system management mode, it is next determined at step 48 whether the presence bit for that processor has been set to a negative indicator or a logical NO. If the presence bit for the subject processor has not been set to a negative indicator or logical NO, the processor performs a loop operation through step 48 until it is determined that the presence bit for the processor has been set to a negative indicator or a logical NO. When this occurs, the subject processor exits system management interrupt mode at step 50. Thus, when it is determined that a processor was not in a halt state immediately before entering system management mode, the processor waits until its presence bit is set to a negative indicator or a logical NO, following which the subject processor exits system management interrupt mode.

With reference to FIG. 3 and the interrupt handling processor, the flow diagram continues at point A following a determination that the subject processor is the interrupt handling processor. At step 52, the interrupt handling processor performs the processing tasks associated with the system management interrupt. At step 54, following the completion of the processing tasks necessary to clear the system management interrupt, the interrupt handling processor selects one of the non-interrupt handling processors and sets that processor's presence bit to a negative indicator or a logical NO. Returning to FIG. 2, it is likely that each processor has reached the loop at step 48 before the time that the interrupt handling processor at 54 selects a first non-interrupt handling processor and sets its presence bit to a logical NO. Thus, with reference to FIG. 2, each non-interrupt handling processor that is not immediately released from system management interrupt mode at step 46 waits for the interrupt handling processor to resolve the interrupt condition so that the interrupt handling processor can reset each processor's indicator, thereby causing that processor to be released from system management interrupt mode. As can be seen from the flow diagrams of FIGS. 2 and 3, once the presence bit of the selected processor is set to a logical NO, the processor exits from system management mode at step 50.

After selecting a first non-interrupt handling processor and setting its presence bit to a logical NO, the interrupt handling processor at step 56 pauses for a predetermined period. The predetermined period is set to be of sufficient length to allow the selected processor the opportunity to retrieve its register contents from its associated SMRAM location in memory 18. In one embodiment, the predetermined pause period of step 56 may be 2 microseconds, for example. Following the predetermined pause at step 56, the interrupt handling processor next determines at step 58 whether the presence bit of all of the non-interrupt handling processors have been set to a logical NO. If the presence bits associated with the non-interrupt handling processors have not been set to a logical NO, the flow diagram continues at step 54, and the interrupt handling processor selects another non-interrupt handling processor and sets its presence bit to a logical NO. In this manner, it can be seen that, once the interrupt handling processor clears the system management interrupt, the interrupt handling processor serially releases each non-interrupt handling processor from system management interrupt mode.

The interrupt handling processor provides each non-interrupt handling processor with a timed release to allow each processor to gain control over the processor bus and system memory. Because of the pipelined or timed release scheme for serially releasing processors from system management mode, there is little, if any, contention for the processor bus 14 or system memory 18, and the group of processors exit from system management interrupt mode more quickly as compared with a simultaneous release accompanied with contention for the processor bus 14 and system memory 18. With reference to FIG. 3, if it is determined at step 58 that the presence bit of all processors have been set to a logical NO, the interrupt handling processor at step 60 exits from system management interrupt mode and terminates the system management interrupt.

It should be recognized that the technique described herein is not limited to the computer architecture shown in FIG. 1. Rather, the techniques described herein may be applied in any multiple processor computer or information handling system when there is contention for resources upon the entry into or the exit from a system interrupt event that influences all the processor resources of the computer system. Although the present disclosure has been described in detail, it should be understood that various changes, substitutions, and alterations can be made hereto without departing from the spirit and the scope of the invention as defined by the appended claims.

What is claimed is:

1. An information handling system, comprising:
   a plurality of processors coupled to a processor bus; and
   a memory;
   wherein an interrupt handling processor of the plurality of processors is assigned to perform processing tasks associated with an interrupt,
   wherein each of the non-interrupt handling processors is configured to enter an interrupt mode and be serially released from the interrupt mode so as to reduce contention by the non-interrupt handling processors for system resources upon release from the interrupt mode, wherein the non-interrupt handling processors are configured to be serially released from the interrupt mode according to a predetermined time delay following the release of each successive non-interrupt handling processor from the interrupt mode, wherein the predetermined time delay is associated with a time sufficient to permit a processor to exit from an interrupt mode without contention for a processor bus or memory in the computer system,
   wherein the interrupt handling processor assigned to perform the processing tasks associated with the interrupt initiates the release of the non-interrupt handling processors from the interrupt mode on a timed release basis following the completion by the interrupt handling processor of the processing tasks associated with the interrupt, and
   wherein the interrupt handling processor assigned to perform the processing tasks associated with the interrupt exits from interrupt mode following the release of the non-interrupt handling processors from interrupt mode.

2. The information handling system of claim 1, wherein the interrupt mode is system management interrupt mode.

3. The information handling system of claim 1, wherein the serial release from the interrupt mode reduces contention by the processors for control of the processor bus and memory.

4. A method for exiting from an interrupt mode in a multiple processor computer system, comprising the steps of:
   for each processor, identifying whether the processor is the interrupt handling processor assigned to perform the processing tasks necessary for resolving the interrupt or a non-interrupt handling processor not assigned to perform the processing tasks necessary for resolving the interrupt;

for each non-interrupt handling processor, remaining in an interrupt mode until initiated to exit the interrupt mode by the interrupt handling processor, wherein the step of remaining in an interrupt mode until initiated to exit the interrupt mode comprises the step of remaining in an interrupt mode until the indicator has been reset by the interrupt handling processor, wherein the indicator for a respective processor is a bit stored in a memory space associated the respective processor;

for at least each non-interrupt handling processor, setting an indicator associated with the respective processor to identify that the respective processor is in an interrupt mode;

for the interrupt handling processor, performing the processing tasks necessary for resolving the interrupt;

for the interrupt handling processor, following the completion of the processing tasks necessary for resolving the interrupt, initiating on a serial basis the exit of each non-interrupt handling processor from interrupt mode, wherein the step of initiating on a serial basis the exit of each non-interrupt handling processor from interrupt mode comprises the steps of:

resetting a bit associated with a first non-interrupt handling processor;

pausing for a time period, wherein the time period is a predetermined time period associated with a time sufficient to permit a processor to exit from an interrupt mode without contention for a processor bus or memory in the computer system; and repeating the steps of resetting and pausing until the interrupt handling processor has initiated the exit of each non-interrupt handling processor from interrupt mode, and for the interrupt handling processor, exiting from interrupt mode after each of the non-interrupt handling processors have exited from interrupt mode.

5. The method for exiting from an interrupt mode in a multiple processor system of claim 4, further comprising the step of, for each non-interrupt handling processor, identifying whether the processor was in a halt state immediately before entering an interrupt mode.

6. The method for exiting from an interrupt mode in a multiple processor system of claim 5, further comprising the step of causing to exit from interrupt mode those non-interrupt handling processors identified as being in a halt state immediately before entering an interrupt mode, without respect to whether the indicator has been reset by the interrupt handling processor.

7. The method for exiting from an interrupt mode in a multiple processor system of claim 4, wherein the interrupt mode is an interrupt mode associated with a system management interrupt.

8. A method for exiting from an interrupt in a multiple processor computer system, wherein each of the processors are coupled to a processor bus, comprising the steps of:

for each processor, setting an indicator associated with the respective processor to indicate that the processor is in an interrupt mode;

identifying the interrupt handling processor responsible for performing the processing tasks necessary to resolve the interrupt condition;

identifying the non-interrupt handling processors not responsible for performing the processing tasks necessary to resolve the interrupt condition;

for each non-interrupt handling processor, determining whether each non-interrupt handling processor was in a halt state immediately before entering the interrupt mode;

for each non-interrupt handling processor, remaining in an interrupt mode until initiated to exit the interrupt mode by the interrupt handling processor;

for the interrupt handling processor, performing the processing tasks necessary to resolve the interrupt condition;

for the interrupt handling processor, following the completion of the processing tasks necessary to resolve the interrupt condition, initiating the serial exit of the non-interrupt handling processors from interrupt mode, wherein the initiating step comprises pausing for a time period between the serial exit of the non-interrupt handling processor from interrupt mode, wherein the time period is a predetermined time period associated with a time sufficient to permit a processor to exit from an interrupt mode without contention for the processor bus or memory in the computer system, whereby contention by the non-interrupt handling processors for control of the processor bus is reduced, and for the interrupt handling processor, exiting from interrupt mode following the exit of each of the non-interrupt handling processors from interrupt mode.

9. The method for exiting from an interrupt in a multiple processor computer system of claim 8, wherein the interrupt mode is associated with a system management interrupt.

10. The method for exiting from an interrupt in a multiple processor computer system of claim 8, wherein the step of remaining in an interrupt mode until initiated to exit the interrupt mode by the interrupt handling processor comprises the step of remaining in an interrupt mode until the interrupt handling processor resets an indicator as an instruction to the non-interrupt handling processor to exit from the interrupt mode.

* * * * *